Aug. 15, 1967 F. P. ALLES 3,336,461

MACHINE FOR TRANSFERRING THERMOPLASTIC IMAGES

Filed April 26, 1965 4 Sheets-Sheet 1

INVENTOR
FRANCIS PETER ALLES

BY Lynn Barratt Morris

ATTORNEY

Aug. 15, 1967 F. P. ALLES 3,336,461

MACHINE FOR TRANSFERRING THERMOPLASTIC IMAGES

Filed April 26, 1965 4 Sheets-Sheet 2

INVENTOR
FRANCIS PETER ALLES

BY Lynn Barratt Morris

ATTORNEY

Aug. 15, 1967 F. P. ALLES 3,336,461

MACHINE FOR TRANSFERRING THERMOPLASTIC IMAGES

Filed April 26, 1965 4 Sheets-Sheet 3

INVENTOR
FRANCIS PETER ALLES

BY Lynn Barratt Morris
ATTORNEY

Aug. 15, 1967 F. P. ALLES 3,336,461

MACHINE FOR TRANSFERRING THERMOPLASTIC IMAGES

Filed April 26, 1965 4 Sheets-Sheet 4

INVENTOR
FRANCIS PETER ALLES

BY Lynn Barratt Morris

ATTORNEY 3,336,461

MACHINE FOR TRANSFERRING THERMOPLASTIC IMAGES

Francis Peter Alles, Basking Ridge, N.J., assignor to E. I. du Pont de Nemours and Company, Wilmington, Del., a corporation of Delaware Filed Apr. 26, 1965, Ser. No. 450,817
5 Claims. (Cl. 219—216)

This invention relates to a machine for transferring thermoplastic images and more particularly images resulting from photopolymerization of polymerizable layers.

Photopolymerizable elements useful for the photocopying of opaque images by photographic exposure and thermal transfer are described in Burg and Cohen U.S. Patent 3,060,023 and assignee's pending patent applications Burg et al., Ser. No. 156,538, filed Dec. 1, 1961, and Ser. No. 163,078, filed Dec. 29, 1961. In the process disclosed in the above Burg and Cohen patent U.S. 3,060,023, a photopolymerizable layer coated on a suitable support is exposed imagewise to an original having line and/or halftone dot images. The surface of the exposed layer is then pressed into contact with the image-receptive surface of a separate element and at least one of said elements is heated, while the surfaces are in contact, to a temperature above the transfer temperature of the underexposed portions of the layer, generally at a temperature of 70–150° C. The two surfaces are then separated whereby the thermally transferable underexposed (i.e., unexposed) image areas of the layer transfer to the image-receptive element and the exposed polymerized image areas remain on their original support. Related processes involving the transfer of pigments and dyes with the underexposed portions of the layer are disclosed in assignee's U.S. patents, Burg and Cohen 3,060,024 and 3,060,025.

Various machines for carrying out the above process have been developed and are disclosed in assignee's U.S. applications, Heiart et al., Ser. No. 234,616, filed Nov. 1, 1962 and Cohen Ser. No. 250,856, filed Jan. 11, 1963. In these machines, the photopolymerizable element is in web form and the machines are most useful for office copy purposes, i.e., copying letter size or legal size sheets.

The machines described in the U.S. applications while of general utility were not designed for precise image transfer techniques; for example, when exact placement or registration of the images on a receptor surface is desired, such as lithographic black-and-white proofing and color proofing. The machines were not designed for reproduction of large image-bearing originals, e.g., engineering drawings with polymerizable elements in the form of large sheets.

Accordingly, it is an object of this invention to provide new and useful machines for thermally transfering imagewise exposed photopolymerizable layers. Another object is to provide simple and dependable apparatus for use while thermally transferring the underexposed portion of a photopolymerizable layer in sheet form to a receptor. Another object is to provide an apparatus that supplies the necessary pressure and heat to produce high quality copies of an original by the thermal transfer of exposed photopolymerizable elements. Yet another object is to provide such apparatus that can faithfully reproduce large originals such as engineering drawings. Still further objects will be apparent from the following description of the invention.

These objects are accomplished by the machines for thermal transfer of an image from the surface of a matrix sheet to the surface of a receptor sheet of this invention which comprise:

(a) a transfer surface having means for heating the same, (b) means for feeding an image-bearing matrix sheet and a receptor sheet into superposition on the surface of said surface, (c) a pivoted arm having separate guide means for receiving the ends of the sheets into superposition with the end of the matrix sheet extending beyond the receptor sheet and said transfer surface, (d) a drive roll adjacent said transfer surface and below the extended position of the matrix sheet, (e) means for removing said arm from its position adjacent the transfer surface and drive roll, (f) a movable guide roll for pressing the matrix sheet against the drive roll, (g) means for applying pressure to the superposed sheets while they are passing across said transfer surface, and (h) means associated with the guide roll for simultaneously deflecting said receptor sheet from the path of the matrix web between said rolls.

The invention will now be described more fully with reference to the accompanying drawings which form a part of this application and wherein the same reference numbers refer to the same parts throughout the several figures. In the drawings.

Figure 1:
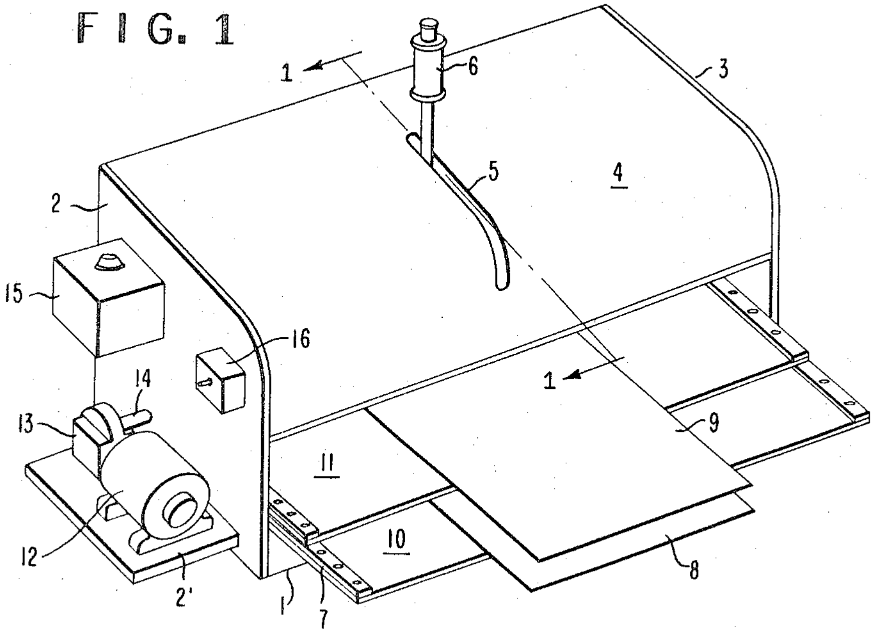
FIG. 1 is an isometric view of an embodiment of the machine showing the loading side.

Referring now to the drawings and more particularly to FIG. 1 where the loading side of the machine is shown, the machine has a housing or frame that consists of a base 1, side walls 2 and 3, and a cover 4. The cover has an opening 5 through which an operating handle 6 extends. The machine has a loading table 7 for receiving and guiding an exposed photopolymerizable matrix sheet 8 and a receptor sheet 9 into the machine.

Whenever the term "matrix" is used it is intended to mean the photopolymerizable composition on a suitable support.

The loading table has guide 10 for the matrix 8 and guide 11 for the receptor sheet. Mounted on bracket 2' extending from side wall 2 is an electric torque motor 12 and interconnected drive unit 13 that is connected to the machine drive roll 14 (see FIG. 2) by a suitable coupler (not shown). A motor control unit 15 for controlling the speed of the drive roll 14, and electrical switch 16 are also mounted on side wall 2.

Figure 2:
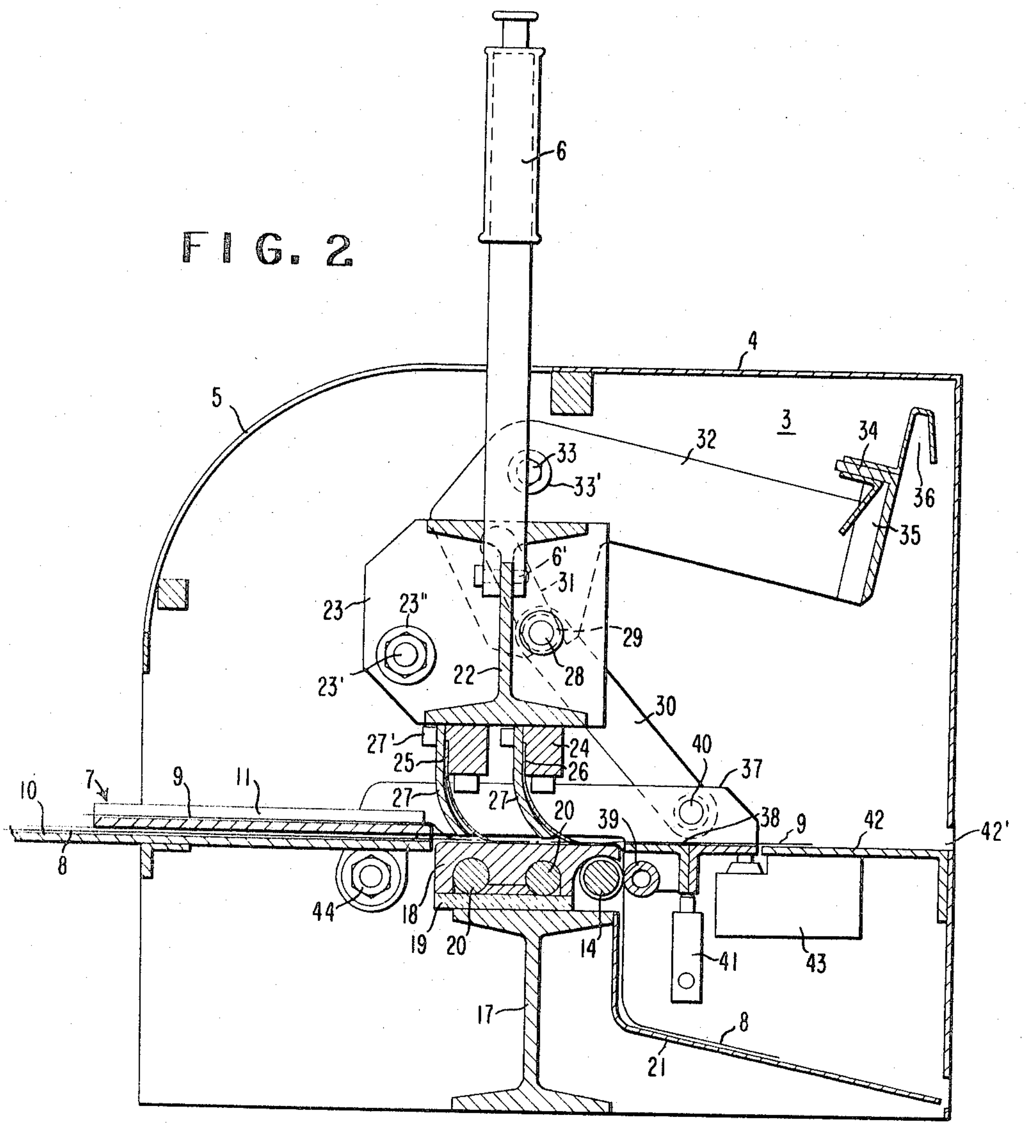
FIG. 2 is a vertical view taken along the line 1—1 of FIG. 1 with parts in section and in elevation, the machine being illustrated in transfer position.
Figure 3:
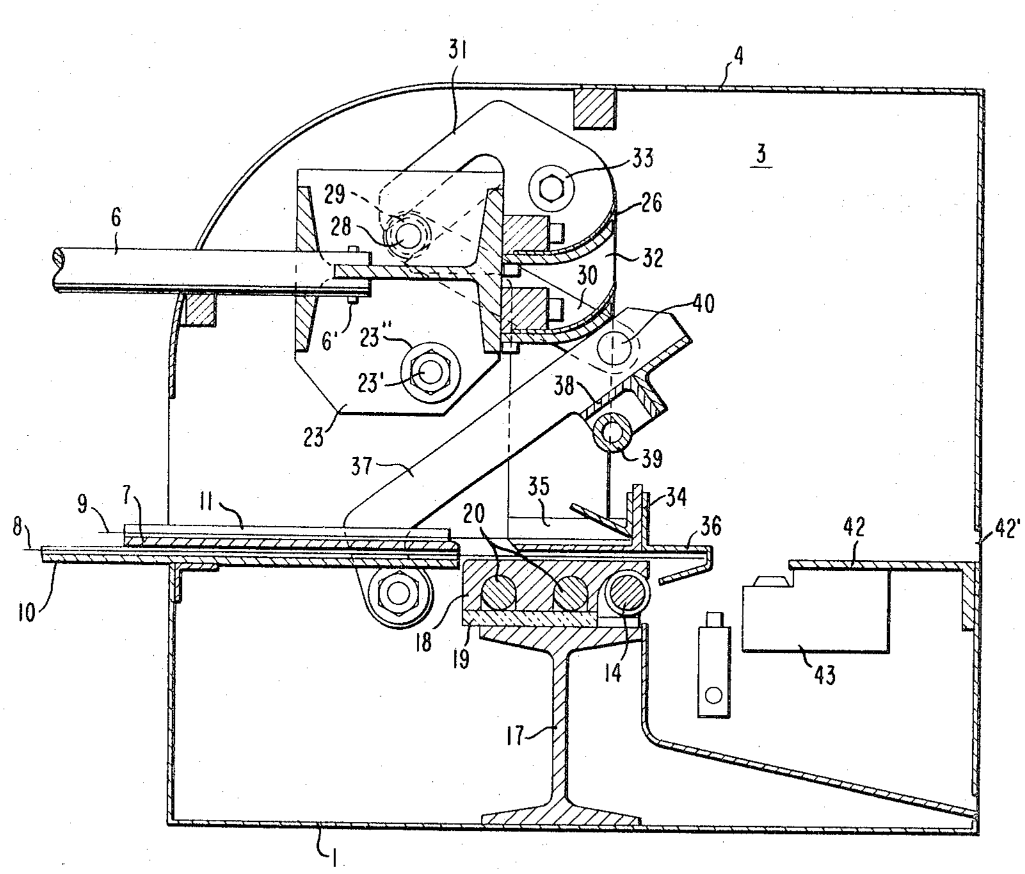
FIG. 3 is a vertical view taken along the line 1—1 of FIG. 1 with parts in section and in elevation; the machine being in loading position.

The main parts of the machine are shown in FIG. 3 in the loading position and in FIG. 2 in the running or transfer position. Within the machine, an I-beam frame member 17 extends along the length of the base 1 of the housing. Mounted on this frame member by machine screws (not shown) and extending almost the entire length of the member, is a platen 18. The platen is fastened near its center by the screws so that expansion of the platen, due to heat, will be directed toward the ends. This platen, which can be made of aluminum, is separated from the frame member 17 by a layer 19 of heat insulative material. The aluminum platen is heated by two heating elements 20, e.g., General Electric "Calrod" tubular heaters composed of a coil of resistance wire packed with magnesium oxide within a protective metal tubing. The drive roll 14, which can be a rubber covered steel roll, is positioned within a groove along one edge of the platen and is journalled into the ends of the platen. One shaft end of the drive roll 14 extends through the platen and side wall 2 and is connected via the coupler to the drive unit 13. Also attached to the platen is a guide member 21 that guides the photopolymer matrix 8 to an exit after the transfer has been accomplished, as will be explained.

Located above the platen is transverse beam member 22. This member embodies an I-beam with integral endplates 23. The endplates are pivotally mounted on side walls 2 and 3 by swivel bolts 23' that are fastened to the walls, and by washers 23''. FIG. 2 and FIG. 3 show the arrangement with respect to wall 3. However, since the construction and operation is identical for side wall 2, all the description to follow is applicable to that wall also.

The clevis end of operating handle 6 fits within an opening and is fastened to the I-beam of the transverse beam member 22 by means of clevis pin 6'. Thus, when the handle is moved in a counterclockwise direction, as viewed in FIG. 3, the beam 22 pivots about bolts 23'. On the bottom of the I-beam there are blade supports 24 which have a suitable groove 25 in which flexible pressure blades 26 are held in place by cover members 27 which are fastened to the supports by suitable screws 27' spaced along the length of the platen.

Mounted on the flange plate of the beam member 22 and located in the area between the plate and the side wall 3 is pintle 28. Rotatably mounted on this pintle 28 are two side-by-side bearing sleeves 29 (only one can be seen in FIGS. 2 and 3). One of these sleeves is fixed within a suitable bored opening in connecting arm 30 and the other assembly is within a groove 31 in one leg of pivoted arm 32. Arm 32 is pivotally mounted on side wall 3 by suitable pivot bolt 33 and washer 33'. An identical arm 32 is similarly mounted on side wall 2. On the other end of guide arm 32 is a transverse dual stop member 34 for receiving the ends of the matrix and receptor sheets. This stop member 34 has an upper slot 35 to position the lead-in end of the receptor sheet 9 and a lower slot 36 to position the lead-in end of the matrix 8. The lower slot, as illustrated in FIG. 3, is designed to position the leading edge of the matrix 8 beyond the platen and also beyond the leading edge of the receptor sheet, which does not extend beyond the platen.

Pivotally mounted at one end to side walls 2 and 3, by pivots 44 are lever arms 37. Connecting arm 30 is linked to the other end of the lever arm 37 by means of pin 40. The unpivoted end of arm 37 is fastened to a movable section 38 of the exit table. Journalled on and below the surface of the table section 38 is a nip or guide roll 39. This roll can be continuous throughout its length or can be segmented.

As shown in FIG. 2, the position of the surface of the movable section of the table when it is in the transfer position is determined by stops 41 which are welded or otherwise fastened to side walls 2 and 3. Adjacent to the movable section is stationary section 42 of the exit table. This section has a surface adjacent slot exit 42' for removal of the image-bearing receptor. Mounted to this stationary portion is an electric microswitch 43 that is actuated by contact with table section 38. When in transfer position, the position illustrated in FIG. 2, this switch is closed. This switch 43 is in the circuit that controls the electric motor 12 which in turn drives the drive roll 14.

This machine is operated as follows. A photopolymerizable matrix 8, i.e., a photopolymerizable layer on a support which may be provided with a removable cover sheet, as described in Heiart, U.S. Patent 3,060,026, is exposed to a graphic original by actinic light, i.e., light containing ultraviolet radiation from a carbon arc, fluorescent sun lamp, xenon arc, etc. This exposure should be sufficient to polymerize the exposed areas. The cover sheet, if present, is then removed and the image-bearing matrix is ready for insertion in the machine of this invention.

At the time of inserting the matrix and receptor sheets, switch 16 is closed, thus energizing the heating elements 20 located within the grooves of platen 18; these elements heat the platen to the desired operating temperature. The machine is then brought to the loading position (as illustrated in FIG. 3) by depressing the operating handle 6. As the handle is being depressed to an essentially horizontal position, several mechanical movements occur simultaneously. The transverse beam member 22 is pivoted around swivel bolts 23' until the pressure blades 26 are removed from contact with platen 18 and are in a position as indicated in FIG. 3. As the beam member is pivoted, pintles 28 affixed to each flange end of the beam member are also pivoted. The movement of these shafts and the bearing sleeves 29 rotatably mounted thereto result in several mechanical actions. The sleeve affixed to connecting arm 30 causes this arm to lift and swing arm 37 about its pivots 44. Movement of arm 37 raises the movable section of the exit table and nip roll 39. As this operation occurs, the other sleeves 29 on shaft 28 located within groove 31 of guide arm 32, coact with the groove to pivot the guide arms about pivots 33. This moves guide arms 32 downward and places dual guide stop 34 in operational position above and adjacent the platen 18 (see FIG. 3).

The matrix 8 is fed into the machine, exposed photopolymer side up, until its leading end stops in lower guide slot 36 at a point beyond the platen and into the area from which movable table section 38 has been removed. The receptor sheet, e.g., paper, drafting film, etc. at the same time is fed, image receptive face down, into upper guide slot 11 until its leading end is stopped by upper guide slot 35; this positions the receptor sheet over matrix 8 with its leading edge above the platen and behind the leading edge of the matrix 8.

Operating handle 6 is manually elevated from the loading position to the running or transfer position (shown in FIG. 2). This action causes several simultaneous mechanical actions. The dual stop member guide 34 on arms 32 rotates about pivots 33 by the coaction of pintles 28, bearing sleeves 29 and grooves 31 until member 34 is in the stand-by position as shown in FIG. 2. The other bearing sleeves 29 on pintles 28 coact with connecting arms 30 and lower the movable section of table 38 to its running position, i.e., the section is lowered until it meets stop 41. As the movable section moves into place, the portion of matrix 8 extending beyond the platen is engaged by the nip roll 39, is forced around the edge of the platen and held between the nip roll 39 and the drive roll 14. When movable section 38 is in running position, switch 43 is closed and motor 12 is energized, thus driving roll 14.

During the foregoing actions, the flexible pressure blades press the superposed receptor sheets and matrix and press them against heated platen 18. While in superposed relation on the platen, thermal transfer of polymerizable material from the matrix to the surface of the receptor occurs.

The superposed sheets are transported through the machine by the pulling of the matrix 8 by the drive roll 14 and nip roll 39. After passing over the platen, the flexible matrix is bent sharply around the platen by the drive and nip rolls. However, the stiffer receptor deflects or peels away from the matrix, bridges the gap between the platen and the movable section of the table and continues across the movable stationary portions of the table to exit 42'.

The conditions of the thermal transfer can be controlled by varying the speed that the matrix is propelled through the machine and/or by regulating the temperature of the platen. The speed of the drive roll 14 is controlled by the motor control unit 15 and, in a practical machine, the matrix speeds are from 3 to 84 inches a minute. The temperature of the platen can be varied from room temperature to approximately 200° C. Control means can be provided for maintaining the platen at the desired temperature. This can be accomplished through use of the thermal expansion of the platen, i.e., the lengthwise expansion of the platen can be used to actuate the switch between on- and off-positions.

Figure 5:
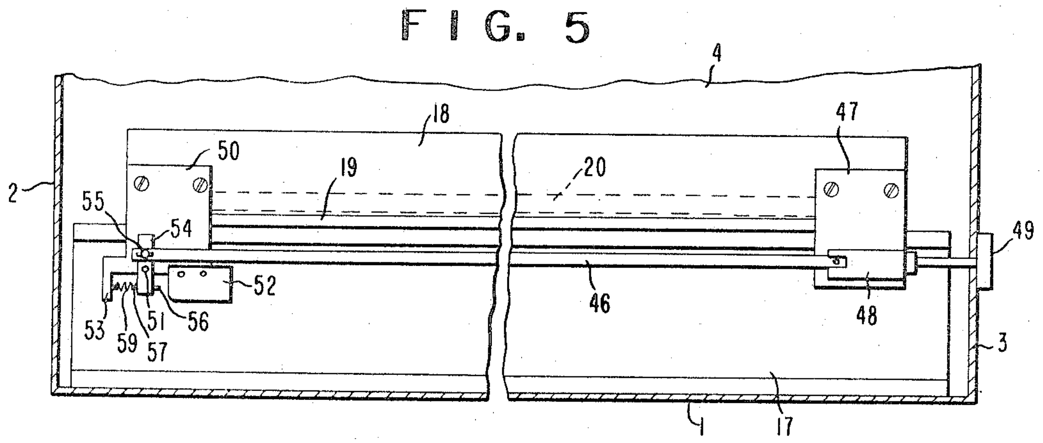
FIG. 5 is a vertical view with parts in section and parts in elevation of a suitable temperature controlling device of the machine.

A suitable temperature controlling device is shown in FIG. 5, where the differential expansion between metal bar 46 (e.g., Invar metal) that runs the length of the machine and the platen (e.g., aluminum) is used for temperature control. For example, at one end of the platen 18, a lateral plate 47 is affixed to the platen by machine screws. On this plate 47, the tractive extension of the Invar bar 46 is pinned to an adjustable tractive plunger 48. Bar 46 is adjusted, i.e., its effective length is changed by rotating dial 49 on the threaded extension of the tractive plunger. By rotating the dial to a previously calibrated setting, the effective length of bar 46 can be set at the length necessary to produce the desired temperature of the platen.

At the other end of the platen there is affixed another lateral plate 50. Attached to this plate is a pin 51, a microswitch 52, and a spring seat 53. Lever 54 is rotatably mounted on the pin 51. The top of the lever 54 is linked to the Invar bar by a stud 55 which passes through a slot in the bar. At the opposite end of the lever on one side is plunger 56 that contacts microswitch 52 and on the other side is a seat 57 for spring 59 that is held between seats 53 and 57.

At the time plunger 56 is in contact with microswitch 52, the circuit to the heating elements is closed. Spring 59 acts against lever 54 to hold the plunger against the switch. As the aluminum platen increases in temperature, it expands (expansion coefficient $23\times10^{-6}$ in./in./° C.), while the Invar bar because of its coefficient of expansion ($0.8\times10^{-6}$ in./in./° C.) does not expand. This differential expansion causes plate 50 and pin 51 to move in the direction toward side wall 2, while the top portion of lever 54 (connected to the Invar bar) remains essentially stationary; thus, lever 54 pivots about stud 55 and also rotates about pin 51. This movement causes the bottom portion of lever 54 to rotate away from the microswitch 52 and toward side wall 2, thus breaking the contact between plunger 56 and the microswitch.

If mechanical amplification of the expansion of the platen is desired, the length of the lever 54 from the stud 55 to the end with the plunger 56 can be two to three times the length from the stud 55 to the top of the lever. Contact will be broken when the platen reaches the desired temperature. The sensitivity of this system is very high because of the long length of the Invar bar 46, the linkage amplification, and the sensitive microswitch.

Microswitch 52 being in the power input circuit for the element 20, can actuate the circuit in several manners. It can have an off-and-on action on the power input, i.e., once the desired temperature is reached the power input is cut off and when the platen cools below this temperature, the shrinking of the platen can cause plunger 56 to contact switch 52 and turn on the current. Alternatively, there can be used a circuit like that described in assignee's pending U.S. application, Lusebrink Ser. No. 283,078, filed May 24, 1963. It provides heating elements in parallel for rapid heating, switching to a series circuit once the desired temperature is reached, thus maintaining the temperature at a reduced power input.

Pressure blades 26, in a practical machine, can be designed to maintain a pressure of 90 lb./in.$^2$ between the receptor and matrix sheets as they pass over the platen. The blades can be made of spring steel, tetrafluorethylene resin covered spring steel, or of tetrafluorethylene resin alone, etc. Two separate blades give better results than a single blade.

Figure 4:
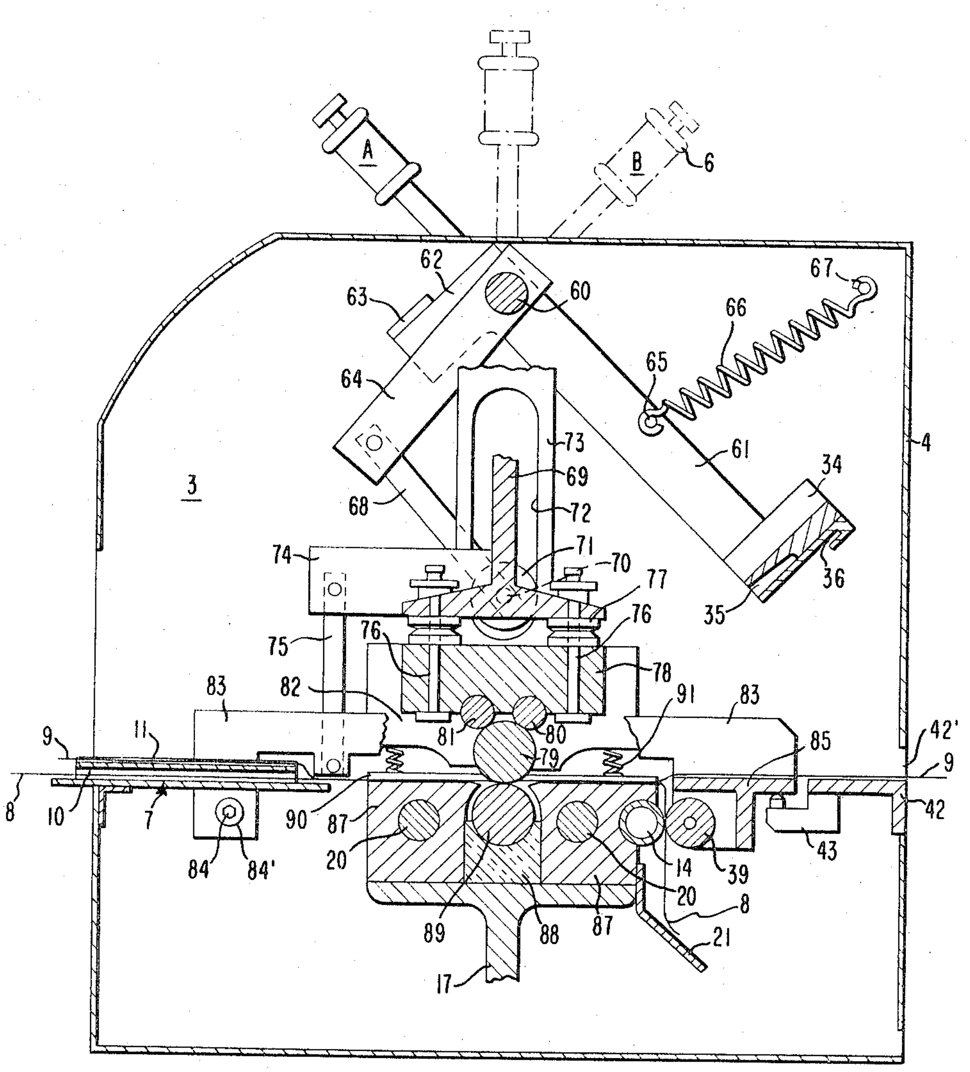
FIG. 4 is a vertical view like that of FIG. 2 with parts in section, in elevation and in broken construction of an alternative embodiment of the machine having roller means for applying pressure; the machine being in the transfer position.

In FIG. 4 there is shown another embodiment of the invention. In this embodiment, instead of using pressure blades, a pressure roller is used. In this embodiment, elements identical in structure and function to corresponding elements in the blade machine illustrated in FIGS. 1, 2 and 3 retain the same numbers. The inner ends of operating handle 6 is keyed to shaft 60 that extends across the machine and is journalled for rotation in side walls 2 and 3. The neutral position of handle 6 is indicated by dotted lines in FIG. 4. Keyed to shaft 60 is a guide arm 61. At one end of this guide arm is stop member 34. Guide arm 61 has a pintle 65 affixed to it, and tension spring 66 extends between this pintle and pintle 67 on side wall 3. This spring urges guide arm 61 into the position shown in FIG. 4. The other end of the guide arm has a lateral arm 62 with a lateral lug 63. On shaft 60, adjacent guide arm 61, a lever 64 is rotatably mounted. Another lever 68 is rotatably mounted near one end to said lever 64, and rotatably mounted at the other end by stubshaft 70 on roller frame member 69. This description is applied to one end of the machine; however, the same elements are present on both ends.

The roller frame is an I-beam having a stubshaft 70 extending from each end at the center and near the base of the I-beam (only one stubshaft shown). Rotatably mounted on these shafts are collar bearings 71 that interfit with vertical groove 72 in guide member 73. The latter member 73 is keyed to shaft 60 but has fixed vertical position. Each end of the I-beam has a lateral integral arm 74, to which a linking arm 75 is rotatably pinned.

Attached to the roller frame member 69 by means of adjustable bolts 76 extending through the base of the I-beam is supporting member 78. Spring washers 77 are placed between the base and member 78. By movement of the adjusting bolts 76, the spacing between the frame member 69 and the roll support 78 can be varied. This, in turn, adjusts the pressure of pressure roller 79 during the transfer step. Pressure roller 79 can be a rubber or synthetic elastomer-covered metal (e.g., steel) roll supported along its length by two spaced metal (e.g., steel) rolls 80 and 81 which are journalled in suitable bearing blocks 82 at each end of the roll supporting member 78.

Linking arm 75 is rotatably pinned to lever arm 83, which is pivotally mounted at one end by means of bolts 84 and washers 84' to side wall 3. The unpivoted end of arm 83 is attached to the movable section of the exit table 85. Journalled into and below the surface of the movable section is a nip or guide roll 39. This roll can be a continuous or segmented metal roll.

The aluminum platen 87 shown in FIG. 4 is divided into two sections, each section being heated by a suitable electric heating element 20. Temperature of the platen can be controlled by the differential expansion of aluminum relative to an Invar metal bar as previously explained. Bearing blocks 88 fit into recesses in the platen. Resting on bearing block 88, which may be made of polytetrafluorethylene, is a metal (e.g., steel) transfer roll 89. This roll is journalled into bearing blocks 90 on each end of the platen. Between bearing blocks 82 and bearing blocks 90 are compression springs 91 that urge the pressure roll 79 away from the transfer roll 89.

The operation of the modified machine, just described, is similar to that of the previously described pressure blade machine. The exposed matrix and receptor are fed into the machine. The heaters 20 are energized, thereby heating the platen 87 and transfer roll 89 to the desired temperature. Operating handle 6 is moved in a clockwise direction (to position B as shown in FIG. 4). This movement will rotate shaft 60 and guide arm 61 in a clockwise direction. Springs 91 force the pressure roller away from the platen while stop member 34 is placed in operational position.

After loading, handle 6 is moved from position B to position A. This movement causes guide arm 61 to move in a counterclockwise direction. As lateral arm 62 of the guide arm moves in this direction, lug 63 engages the lever 64 and forces it to move downward and in a counterclockwise direction. Lever 64 being linked by lever 68 to the roller frame member 69, moves downwardly; i.e., bearings 71 move in grooves 72 of the stationary guide 73, to guide the member 69 downwardly. As this downward movement occurs, roller 79 contacts the superposed matrix and receptor as they pass over transfer roll 89. The pressure exerted depends upon the degree of adjustment of bolts 76 and washers 77. This movement compresses springs 91.

The downward movement of frame member 69 and its lateral arm 74 causes lever arm 83 to pivot and to place the movable section of the exit table into its running position. At the same time, the matrix 8 is pinched between drive roll 14 and nip rolls 39. At this time, switch 43 is closed and the driving unit of the machine is energized, thus driving roll 14, which in cooperation with nip roll 39 pulls the matrix 8 through the machine. Heated platens 87 and the heated transfer roll 89 provide the necessary temperature for thermal transfer, while roll 79 provides the necessary pressure. As the matrix 8 is pulled around the platen by the drive and nip rolls, the receptor, because of its relative rigidity, continues on the exit table and leaves the machine with its transferred polymeric image.

Transfer roll 89 and drive roll 14 can be driven by a suitable gear linkage. By varying the gears, the two rolls can move at identical or different speeds. For example, the drive roll can be driven 2–5% faster than the transfer roll to provide better separating or stripping action.

While the invention has been described with respect to certain particular arrangements, it will be evident that various changes and modifications may be made without departing from the scope and spirit of the invention.

The various parts of the machine can be made from conventional materials of construction. The frame and covers can be made of metal including steel, steel alloys, aluminum, aluminum alloys, copper, brass, plastic materials, etc. They may be painted or provided with protective surfaces.

Some of the photopolymerizable elements useful in the subject machine are described in Burg. et al., U.S. Patents 3,060,023, 3,060,024, 3,060,025; Heiart 3,060,026, and assignee's pending patent applications Burg et al., Ser. No. 163,078, filed Dec. 29, 1961, and Ser. No. 156,-538, filed Dec. 1, 1961.

These photopolymerizable elements generally exhibit their maximum sensitivity in the ultraviolet range, thus the exposure means should usually furnish an effective amount of this radiation. Such sources include carbon arcs, mercury vapor arcs, flourescent lamps with ultraviolet radiation-emitting phosphors, argon glow lamps, electron flash units and photographic flood lamps. Of these, the mercury-vapor arcs are customarily used at a distance of one and one-half to 20 inches from the photopolymerizable layer. It is noted, however, that in certain circumstances it may be advantageous to expose with visible light, using a photoinitiator sensitive in the visible region of the spectrum, e.g., 9,10-phenanthrenequinone. In such cases, the radiation source should furnish an effective amount of visible radiation. Many of the radiation sources listed above furnish the required amount of visible light. Additionally, when exposing engineering drawings to produce copies, conventional "white printers" such as a Blu-Ray® rotary diazo printer may be used.

While the machines of this invention are designed primarily for thermal transfer of large sheets of photopolymerizable materials, they are not limited to such purposes, as lettersize, legal and other size sheets can be used.

An advantage of this machine is that it provides high quality copies of graphic originals by thermal transfer. Another advantage is that the machine can handle large sheets of photopolymerizable matrix.

Another advantage of the machine is that it requires no particular skill to operate it; it is self-contained, portable, and semi-automatic. Yet another advantage is that the machine is dependable in operation and durable.

What is claimed is:

1. A machine for the thermal transfer of images which comprises
   (a) a transfer surface having means for heating the same,
   (b) means for feeding an image-bearing matrix sheet and a receptor sheet into superpositions on said surface,
   (c) a pivoted arm having separate guide means for receiving the ends of the sheets into superposition, with the end of the matrix sheet extending beyond the receptor sheet and said transfer surface,
   (d) a drive roll adjacent said transfer surface and below the extended position of the matrix sheet,
   (e) means for removing said arm from its position adjacent the transfer surface and drive roll,
   (f) a movable guide roll for pressing the matrix sheet against the drive roll,
   (g) means for applying pressure to the superposed sheets while they are passing across said transfer surface,
   (h) means associated with the guide roll for simultaneously deflecting said receptor sheet from the path of the matrix web between said rolls.

2. A machine according to claim 1 wherein the means for applying pressure of paragraph (g) embodies flexible blades.

3. A machine according to claim 1 wherein the means for applying pressure of paragraph (g) embodies a yieldable transverse frame bearing a roller.

4. A machine according to claim 1 wherein said transfer surface is a platen.

5. A machine according to claim 1 wherein said transfer surface is a roll.

References Cited

UNITED STATES PATENTS

| | | | |
|---|---|---|---|
| 2,835,179 | 5/1958 | Fairbank | 95—75 |
| 3,044,386 | 7/1962 | Limberger | 95—77.5 |
| 3,048,695 | 8/1962 | Russell | 250—65 |
| 3,085,488 | 4/1963 | Heiart | 95—75 |
| 3,131,302 | 4/1964 | Kimble | 250—65 |
| 3,142,241 | 7/1964 | Limberger | 118—77 X |
| 3,202,072 | 8/1965 | Limberger | 95—89 |
| 3,249,738 | 5/1966 | Simms et al. | 219—216 |

RICHARD M. WOOD, *Primary Examiner.*

C. L. ALBRITTON, *Assistant Examiner.*